(12) United States Patent
Wang et al.

(10) Patent No.: US 8,104,055 B2
(45) Date of Patent: Jan. 24, 2012

(54) METHOD OF IDENTIFYING TARGET SYNCHRONIZATION POINT PAIR THROUGH SCAN-LINE IMAGE MATCHING SCHEME

(75) Inventors: Bei Wang, Jiangsu (CN); Chia-Hung Yeh, Tai-Nan (TW); Hsuan-Huei Shih, Taipei (TW); Chung-Chieh Kuo, Taipei (TW)

(73) Assignee: MAVs Lab. Inc., Songshan Dist., Taipei (TW)

( * ) Notice: Subject to any disclaimer, the term of this patent is extended or adjusted under 35 U.S.C. 154(b) by 970 days.

(21) Appl. No.: 11/940,300

(22) Filed: Nov. 14, 2007

(65) Prior Publication Data

US 2009/0122189 A1   May 14, 2009

(51) Int. Cl.
*H04N 7/173* (2011.01)
*H04N 5/445* (2011.01)
*G06K 9/46* (2006.01)
*G06K 9/00* (2006.01)
*G06K 15/02* (2006.01)

(52) U.S. Cl. ............ 725/19; 725/17; 348/500; 382/193; 382/222

(58) Field of Classification Search .................... 725/81, 725/17, 19; 348/500; 382/193, 222
See application file for complete search history.

(56) References Cited

U.S. PATENT DOCUMENTS

| 5,889,529 | A  | * | 3/1999 | Jones et al. ................. 345/660 |
| 5,892,536 | A  | * | 4/1999 | Logan et al. ................. 725/34 |
| 6,701,014 | B1 |   | 3/2004 | Syeda-Mahmood |
| 6,973,259 | B1 | * | 12/2005 | Todaka ...................... 382/190 |
| 2007/0160128 | A1 |   | 7/2007 | Tian |

OTHER PUBLICATIONS

Rakesh Mohan, "Video Sequence Matching", Acoustics, Speech and Signal Processing, 1998. Proceedings of the 1998 IEEE International Conference, May 1998, p. 3697-p. 3700, vol. 6.

* cited by examiner

*Primary Examiner* — Pankaj Kumar
*Assistant Examiner* — Reuben Brown
(74) *Attorney, Agent, or Firm* — Winston Hsu; Scott Margo

(57) ABSTRACT

A method of identifying a target synchronization point pair including a source synchronization point corresponding to a source end and a destination synchronization point corresponding to a destination end is provided. The method includes receiving a source scan-line image corresponding to a first video source from the source end; selecting at least a comparing frame out of the source scan-line image; providing a destination scan-line image corresponding to a second video source at the destination end; and determining the target synchronization point pair by comparing the comparing frame and the destination scan-line image.

25 Claims, 10 Drawing Sheets

METHOD OF IDENTIFYING TARGET SYNCHRONIZATION POINT PAIR THROUGH SCAN-LINE IMAGE MATCHING SCHEME

BACKGROUND OF THE INVENTION

1. Field of the Invention

The present invention is related to achieving video synchronization between a source end (i.e., a server end) and a destination end (i.e., a user end), and more particularly, to a method of identifying a target synchronization point pair corresponding to the source end and the destination end through a scan-line image matching scheme.

2. Description of the Prior Art

When watching pre-recorded TV programs, the user sometimes wants to view exciting events only. For example, when watching the pre-recorded baseball game, the user might have interest in those special moments when the home runs, hits, or strikeouts occur. To meet user's need, the source end (i.e., the server end), which is responsible for broadcasting a TV programs such as a sports game, is kind to distribute a highlight indexing file including time positions and time durations for the exciting events in the TV program. After the destination end (i.e., the user end) receives the highlight indexing file, it can uses the highlight indexing file to allow the user to quickly view any exciting events included in the recorded TV program.

However, a time shift may exist between the source end and the destination end due to discrepancy in time systems. For example, the source end has a universal time system, and the destination end has a time system asynchronous to the universal time system. As a result, the highlight location given under the universal time system at the source end might not work under a different time system at the destination end. Additionally, it is possible that the TV channel used at the source end for broadcasting the TV program is different from that used by the destination end for receiving the TV program. For example, the source end and the destination are located at different regions or countries. Therefore, the commercials inserted to the TV program broadcasted at the source end which provides the highlight indexing file might be different from that inserted to the TV program received at the source end. Furthermore, the video format of the TV program broadcasted at the source end might be different from that of the TV program received at the source end. For instance, the image resolution or frame rate (e.g., frame per second, FPS) varies due to different video settings at the source end and the destination end.

As a result, in order to quickly view exciting events by utilizing the highlight indexing file given by the source end, the user has to manually find the video synchronization point between the original TV program broadcasted at the source end and the received TV program recorded at the destination end. It is very inconvenient to the user at the destination end. Therefore, a robust, fast, and automatic synchronization algorithm is required to efficiently determine the time shift between the source end and the destination end.

SUMMARY OF THE INVENTION

It is therefore one of the objectives of the present invention to provide a method of identifying a target synchronization point pair corresponding to a source end and a destination end through a scan-line image matching scheme and referring to the target synchronization point pair for estimating the time shift between the source end and the destination end.

According to an exemplary embodiment of the present invention, a method of identifying a target synchronization point pair including a source synchronization point corresponding to a source end and a destination synchronization point corresponding to a destination end is provided. The method includes receiving a source scan-line image corresponding to a first video source from the source end; selecting at least a comparing frame out of the source scan-line image; providing a destination scan-line image corresponding to a second video source at the destination end; and determining the target synchronization point pair by comparing the comparing frame and the destination scan-line image.

These and other objectives of the present invention will no doubt become obvious to those of ordinary skill in the art after reading the following detailed description of the preferred embodiment that is illustrated in the various figures and drawings.

DETAILED DESCRIPTION

In this present invention, a source end (i.e., a server end) is responsible for providing scan-line image information requested by a destination end (i.e., a user end) to help the destination end to identify a synchronization point pair. In an exemplary embodiment of the present invention, a video matching scheme using scan-line images is proposed. The exemplary scan-line image matching scheme receives a source scan-line image corresponding to a first video source from the source end, selects at least a comparing frame out of the source scan-line image, provides a destination scan-line image corresponding to a second video source at the destination end, and determines the target synchronization point pair by comparing the comparing frame and the destination scan-line image. Further description is detailed as below.

Figure 1:
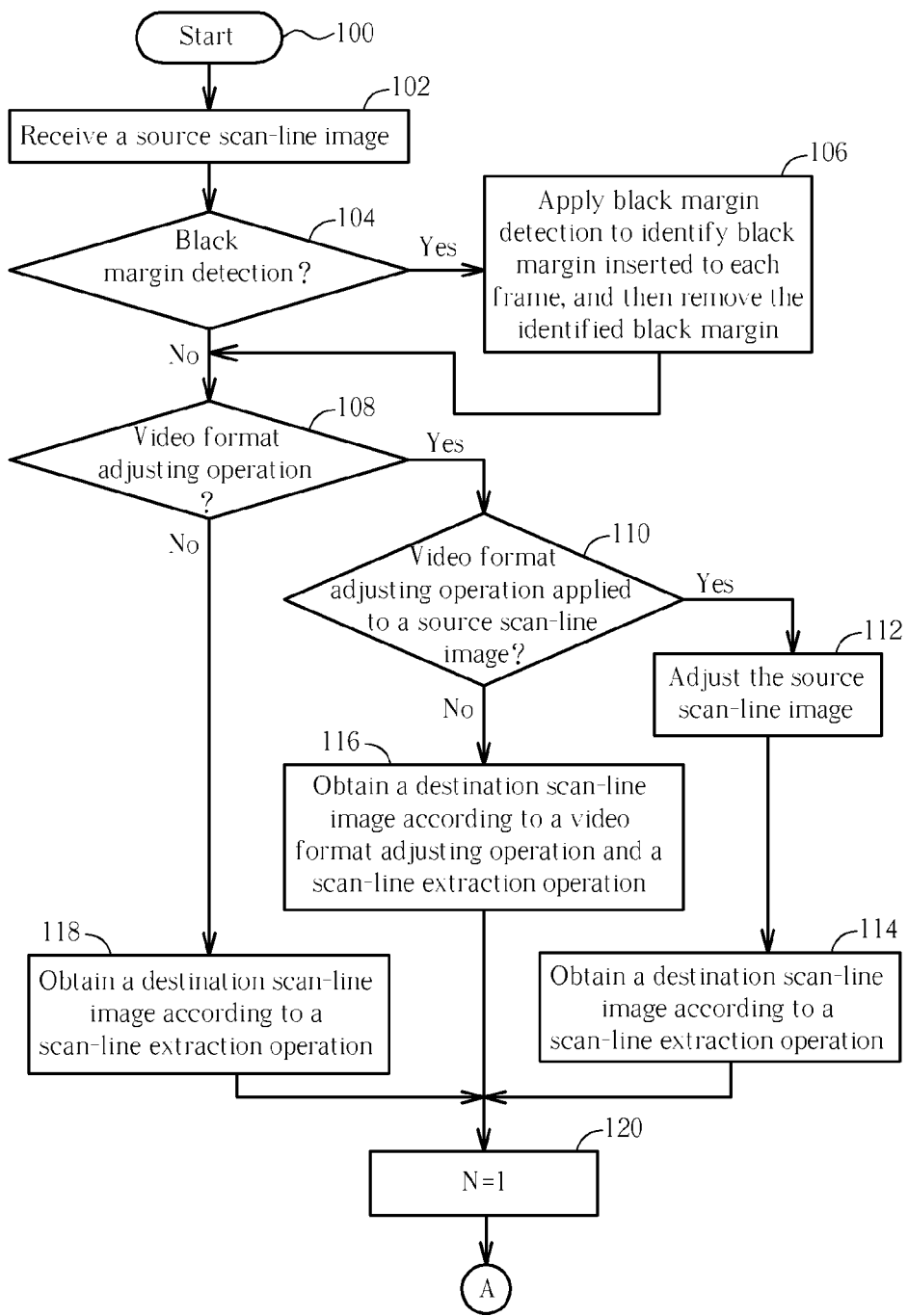
FIG. 1 is a flowchart illustrating a method of identifying a synchronization point pair corresponding to a source end and a destination end according to an embodiment of the present invention.
Figure 2:
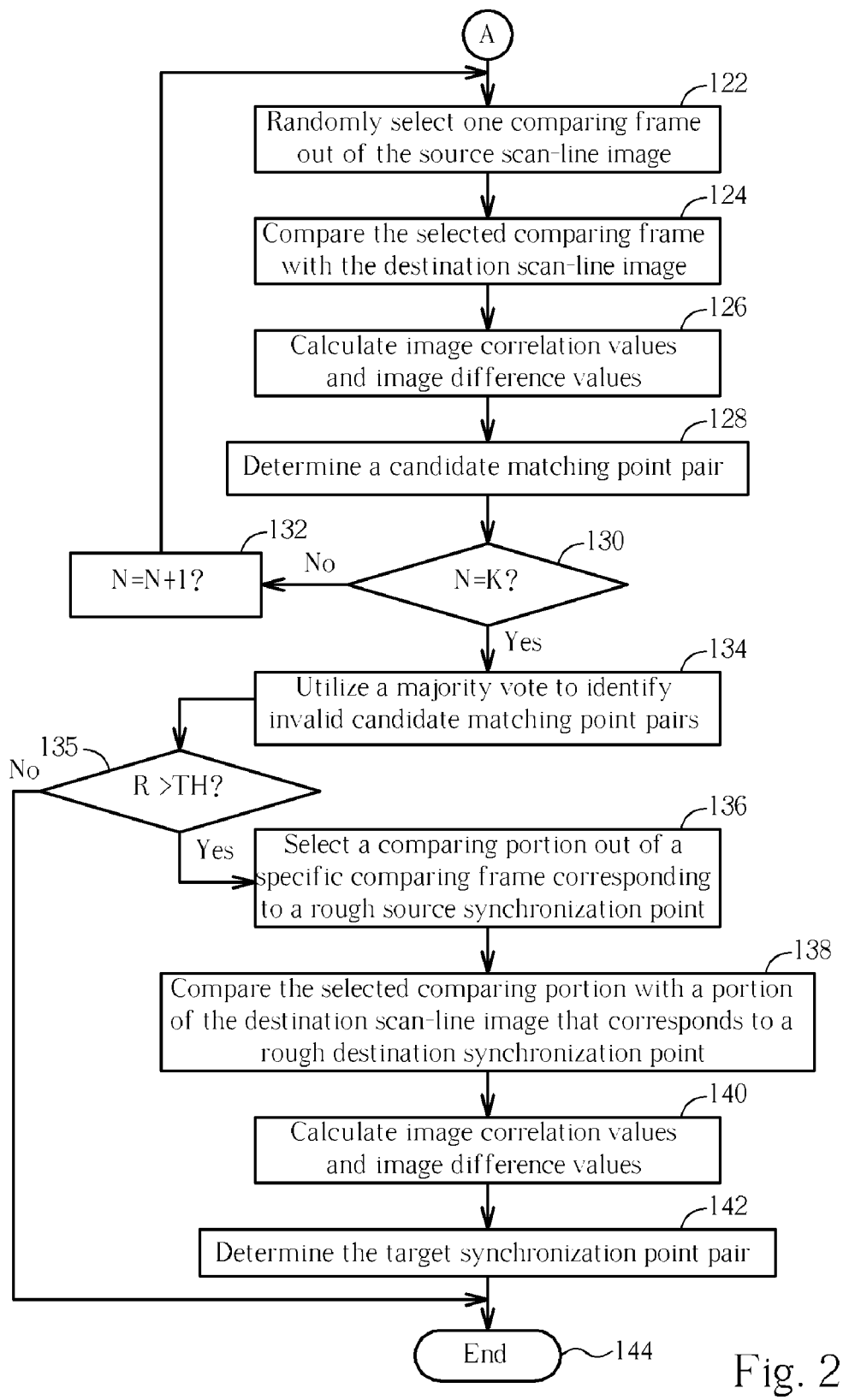
FIG. 2 is a continued flowchart of FIG. 1.

Please refer to FIG. 1 and FIG. 2. FIG. 1 is a flowchart illustrating a method of identifying a synchronization point pair corresponding to a source end and a destination end according to an embodiment of the present invention. FIG. 2 is a continued flowchart of FIG. 1. Provided the result is substantially the same, the steps are not limited to be executed according to the exact order shown in FIG. 1. The method of identifying the synchronization point pair includes following steps:

Step 100: Start.

Step 102: Receive a source scan-line image corresponding to a first video source (e.g., a TV program) from a source end.

Step 104: Check if black margin detection is required? If yes, go to step 106; otherwise, go to step 108.

Step 106: Apply the black margin detection to a second video source (e.g., a TV program) recorded at a destination end to identify a black margin inserted to each frame of the second video source, and remove the identified black margin from each frame of the second video source.

Step 108: Check if a video format adjusting operation is required? If yes, go to step 110; otherwise, go to step 118.

Step 110: Is the video format adjusting operation applied to the source scan-line image? If yes, go to step 112; otherwise, go to step 116.

Step 112: Adjust the source scan-line image through the video format adjusting operation (e.g., a down-sampling operation or up-sampling operation). As a result, the video format discrepancy between the source scan-line image and the destination scan-line image, including image resolution change, frame rate change, or both, is removed due to the proposed video format adjusting operation applied to the source scan-line image. Further description is detailed later.

Step 114: Obtain a destination scan-line image corresponding to the second video source recorded at the destination end according to a scan-line extraction operation. Go to step 120.

Step 116: Obtain a destination scan-line image corresponding to the second video source recorded at the destination end according to a video format adjusting operation (e.g., a down-sampling operation or up-sampling operation) and a scan-line extraction operation. Due to the proposed video format adjusting operation applied to the destination scan-line image, the video format discrepancy between the source scan-line image and the destination scan-line image, including image resolution change, frame rate change, or both, is removed. Further description is detailed later. The flow then goes to step 120.

Step 118: Obtain a destination scan-line image corresponding to the second video source recorded at the destination end according to a scan-line extraction operation.

Step 120: Set N=1.

Step 122: Randomly select one comparing frame out of the source scan-line image.

Step 124: Compare the selected comparing frame with the destination scan-line image according to a sliding window having a size equal to that of the comparing frame.

Step 126: Calculate a plurality of image correlation values and a plurality of image difference values according to the selected comparing frame and the sliding window.

Step 128: Determine a candidate matching point pair according to the image correlation values and the image difference values.

Step 130: Is N=K? If yes, go to step 134; otherwise, go to step 132.

Step 132: N=N+1. Go back to step 122.

Step 134: Utilize a majority vote to identify invalid candidate matching point pairs.

Step 135: Does a ratio R of valid candidate matching point pairs to invalid candidate matching point pairs exceed a predetermined threshold TH? If yes, go to step 136; otherwise, go to step 144.

Step 136: Select a rough synchronization point pair out of valid candidate matching point pairs, wherein the rough synchronization point pair includes a rough source synchronization point of the source end and a rough destination synchronization point of the destination end.

Step 136: Select a comparing portion out of a specific comparing frame corresponding to the rough source synchronization point.

Step 138: Compare the selected comparing portion with a portion of the destination scan-line image that corresponds to the rough destination synchronization point according to a sliding window having a size equal to that of the comparing portion.

Step 140: Calculate a plurality of image correlation values and a plurality of image difference values according to the selected comparing portion and the sliding window.

Step 142: Determine the target synchronization point pair according to the image correlation values and the image difference values.

Step 144: End.

Figure 3:
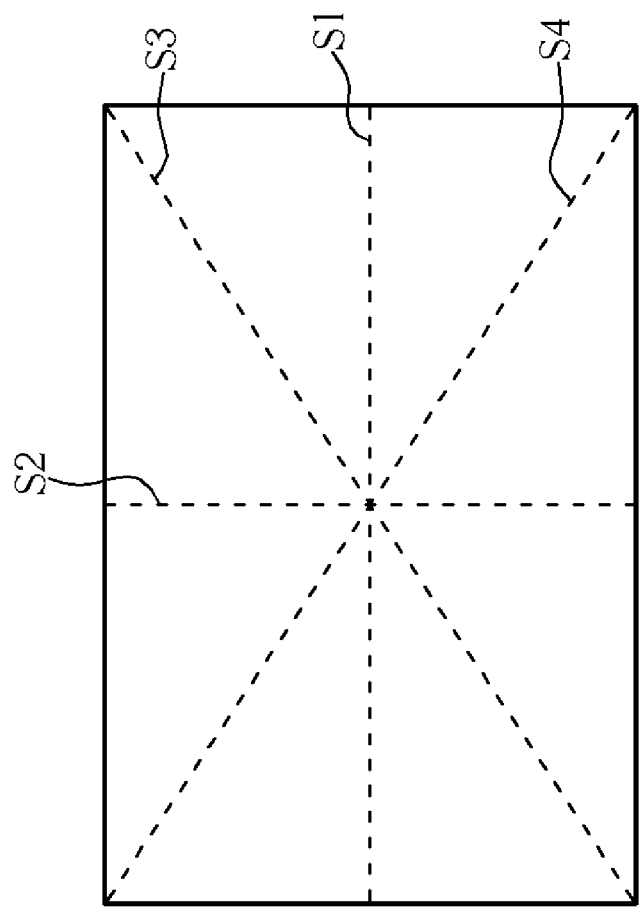
FIG. 3 is a diagram illustrating some exemplary scan-line positions.
Figure 4:
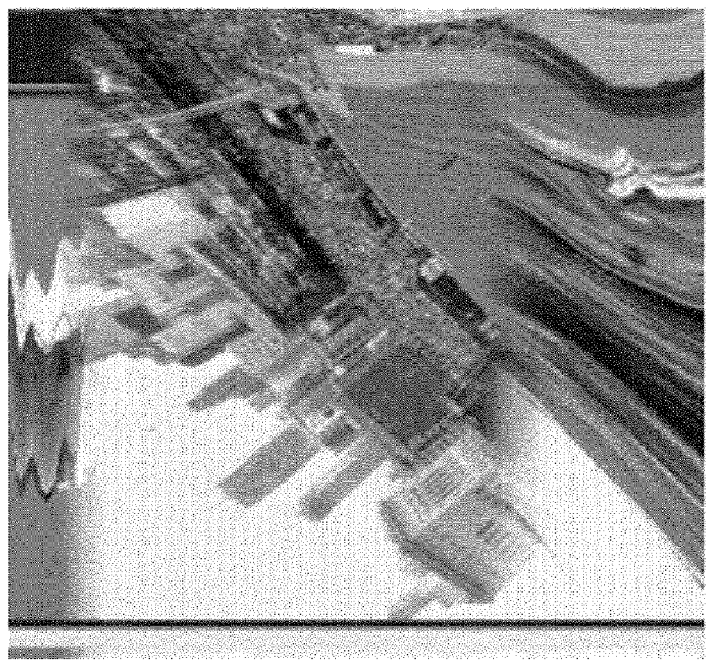
FIG. 4 is a diagram illustrating an exemplary scan-line image created by scan-lines at a specific scan-line position.

In step 100, the flow begins. In step 102, the source end is requested by the destination end to provide a source scan-line image corresponding to a first video source (i.e., a TV program broadcasted at the source end). Please refer to FIG. 3 in conjunction with FIG. 4. FIG. 3 is a diagram illustrating some exemplary scan-line positions, and FIG. 4 is a diagram illustrating an exemplary scan-line image created by scan-lines at a specific scan-line position. In FIG. 3, four possible scan-line positions S1, S2, S3, and S4 are shown in a single frame. As to the first video source, provided the scan-line position S4 is used, the source scan-line image is generated by gathering a scan-line at the scan-line position S4 from each frame of the first video source. For example, the diagonal scan-line at the scan-line position S4 is extracted from a first frame of the first video source and becomes a first row of the source scan-line image; and the diagonal scan-line at the scan-line position S4 from a second frame following the first frame and becomes a second row of the source scan-line image. Therefore, when the source video source is a baseball game, the exemplary source scan-line image is shown in FIG. 4. It should be noted that the above example is for illustrative purposes only, and is not meant to be a limitation of the present invention. That is, selection of the scan-line position depends upon design requirements.

In Step 104, the flow checks if black margin detection is required. For example, if the scan-line position is selected to be S1 shown in FIG. 3, there is no need to perform the black margin detection for removing the black margin as the scan-line image used for finding the synchronization point contains no black margin information; otherwise, the black margin detection is required to detect the existence of the black margin included in the second video source recorded at the destination end. If the first video source includes no black margin added to each frame therein, but the second video source includes black margin added to each frame therein, the disclosed scan-line image matching scheme might produce erroneous results due to the undesired black margin information included in the destination scan-line image generated from the second video source recorded at the destination end. Therefore, step 106 is enabled to detect the black margin inserted to each frame of the second video source and remove the black margin if it is found. To simply the computational complexity, the present invention provides a simple and fast black margin detection means as below.

Figure 5:
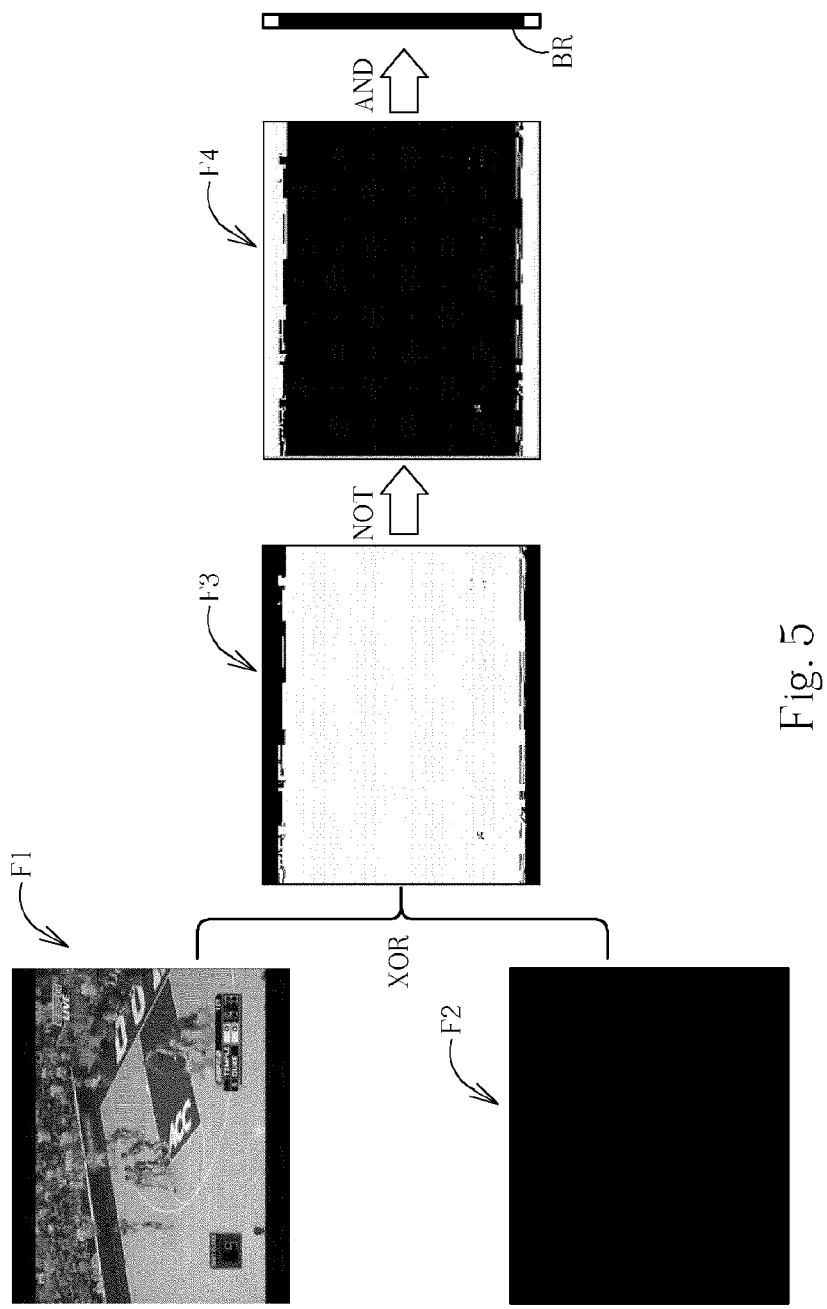
FIG. 5 is a diagram illustrating exemplary black margin detection according to the present invention.
Figure 6:
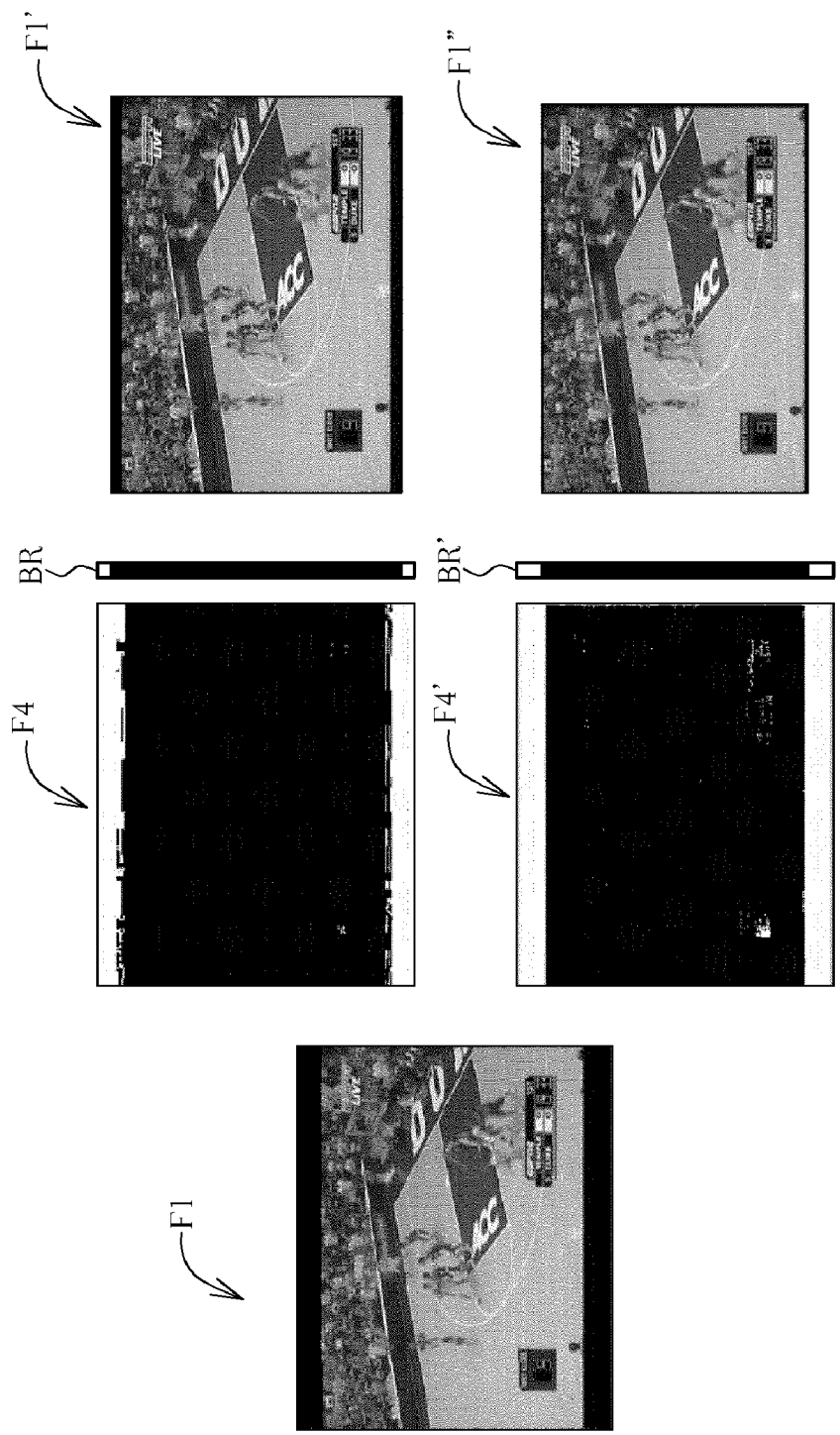
FIG. 6 is a diagram illustrating the result of removing the black margin component in the frame F1 shown in FIG. 5.

Please refer to FIG. 5. FIG. 5 is a diagram illustrating an exemplary black margin detection according to the present invention. As depicted in FIG. 5, a frame F1 of the second video source contains black margin. The black margin detection scheme of the present invention first generates a black image F2 having a size equal to that of the frame F1 to be processed. It should be noted that if the gray level range is from 0 through 255, the gray level of each pixel in the black image F2 is equal to 0. Then, an XOR operation is applied to combine the frames F1 and F2 to generate a binary image (or called "bitmap" that generally stores one bit per pixel) F3, wherein each black point shown in the binary image (bitmap) F3 has a binary bit "0" and each white point shown in the binary image (bitmap) F3 has a binary bit "1". Next, a NOT operation is applied to the binary image (bitmap) F3 to generate an updated binary image (updated bitmap) F4. In order to find the black margin, the black margin detection scheme of the present invention applies an AND operation to all of the pixels disposed at the same row for estimating the black margin presented in the frame F1. In other words, in this embodiment, if all of the pixels at the same row have the same binary bit "1", it is determined that this row belongs to the black margin. The border information BR shown in FIG. 5 is then used for removing the black margin component in the frame F1. Please refer to FIG. 6. FIG. 6 is a diagram illustrating the result of removing the black margin component in the frame F1. After obtaining the border information BR associated with the black margin, the frame F1 is processed according to the border information BR. As shown in FIG. 6, the resultant frame F1' has smaller black margin remained therein.

The frame F1 is provided from the recorded second video source at the destination end. In general, the second video source is recorded from compressing the incoming video stream. For example, a block-based compression scheme, such as an MPEG-2 compression, is implemented to generate the second video source. However, the black margin inserted to each frame of the incoming video stream is not an integer multiple of the a compression block size, resulting in noise introduced to border of the black margin in the frame F1 decoded from the second video source. As a result, the noise introduced at the border of the black margin will affect the final result of removing the black margin. Therefore, the present invention further provided a modified black margin detection scheme by pre-processing the frame F1 before the XOR operation is executed. In one embodiment, the modified black margin detection scheme pre-processes the frame F1 by making each pixel having an original pixel value (i.e., a gray level) equal to or smaller than a predetermined value (e.g., 5) to have an updated pixel value equal to zero. In this way, the noise interference at the border of the black margin is suppressed greatly. As shown in FIG. 6, the binary image (bitmap) F4', compared to the original binary image (bitmap) F4, has less noise interference at the border of the black margin. After obtaining the border information BR' through the modified black margin detection scheme, the black margin component can be easily removed using the border information BR'. As shown in FIG. 6, the resultant frame F1", compared to the original frame F1', has smaller black margin area due to the aforementioned pre-processing applied to the frame F1.

As stated above, it is possible that the video format of the first video source at the source end (e.g., the image resolution or frame rate) is different from that of the second video source at the destination end. Additionally, the image resolution of the black margin removed frames (i.e., the frame F1' or F1" shown in FIG. 6) might be different from that of the frames in the first video source. Therefore, step 108 is executed to check if there is a video format discrepancy between the first video source and second video source or between the black margin removed frames and the first video source. If there is no video format discrepancy, step 118 is enabled to obtain the destination scan-line image by extracting a scan-line at a scan-line position (e.g., S4 shown in FIG. 3) from each frame in the recorded second video source or from each black margin removed frame of the recorded second video source. However, if there is video format discrepancy between the first video source and the second video source or between the black margin removed frames and the first video source, a video format adjusting operation is enabled to adjusting the image resolution, frame rate, or both. Further description is detailed as below.

Suppose the video format adjusting operation is configured to be applied to the source scan-line image when there is image resolution/frame rate discrepancy between the first video source and the second video source or between the black margin removed frames and the first video source (step 110). In one case where no black margin removal is performed and the image resolution/frame rate of the first video source is greater than the image resolution/frame rate of the second video source, step 112 down-samples the source scan-line image according to the resolution/frame rate discrepancy between the first video source and the second video source, and step 114 extracts a scan-line from each frame of the second video source to obtain a destination scan-line image. In another case where no black margin removal is performed and the image resolution/frame rate of the first video source is smaller than the image resolution/frame rate of the second video source, step 112 up-samples the source scan-line image according to the resolution/frame rate discrepancy between the first video source and the second video source, and step 114 extracts a scan-line from each frame of the second video source to obtain a destination scan-line image.

In another case where the black margin removal has been performed and the image resolution/frame rate of the first video source is greater than the image resolution/frame rate of the black margin removed frames of the second video source, step 112 down-samples the source scan-line image according to the image resolution/frame rate discrepancy between the black margin removed frames and the first video source, and step 114 extracts a scan-line from each black margin removed frame to obtain the destination scan-line image. In another case where the black margin removal has been performed and the image resolution/frame rate of the first video source is smaller than the image resolution/frame rate of the black margin removed frames of the second video source, step 112 up-samples the source scan-line image according to the image resolution/frame rate discrepancy between the black margin removed frames and the first video source, and step 114 extracts a scan-line from each black margin removed frame to obtain the destination scan-line image.

Suppose the video format adjusting operation is not applied to the source scan-line image when there is image resolution/frame rate discrepancy between the first video source and the second video source or between the black margin removed frames and the first video source (step 110). In one case where no black margin removal is performed and the image resolution/frame rate of the first video source is greater than the image resolution/frame rate of the second video source, step 116 up-samples frames of the second video source according to the image resolution/frame rate discrepancy between the first video source and the second video source, and then extracts a scan-line from each up-sampled frame of the second video source to generate the destination scan-line image. In another case where no black margin removal is performed and the image resolution/frame rate of the first video source is greater than the image resolution/frame rate of the second video source, step 116 extracts a scan-line from each frame of the second video source to generate a scan-line image, and then up-samples the scan-line image to generate the destination scan-line image according to the image resolution/frame rate discrepancy between the first video source and the second video source. In another case where no black margin removal is performed and the image resolution/frame rate of the first video source is smaller than the image resolution/frame rate of the second video source, step 116 down-samples frames of the second video source according to the image resolution/frame rate discrepancy between the first video source and the second video source, and then extracts a scan-line from each down-sampled frame of the second video source to generate the destination scan-line image. In another case where no black margin removal is performed and the image resolution/frame rate of the first video source is smaller than the image resolution/frame rate of the second video source, step 116 extracts a scan-line from each frame of the second video source to generate a scan-line image, and then down-samples the scan-line image to generate the destination scan-line image according to the image resolution/frame rate discrepancy between the first video source and the second video source.

In another case where the black margin removal has been performed and the image resolution/frame rate of the first video source is greater than the image resolution/frame rate of the black margin removed frames of the second video source, step 116 up-samples the black margin removed frames according to the image resolution/frame rate discrepancy between the black margin removed frames and the first video source, and then extracts a scan-line from each up-sampled black margin removed frame to obtain the destination scan-line image. In another case where the black margin removal has been performed and the image resolution/frame rate of the first video source is greater than the image resolution/frame rate of the black margin removed frames of the second video source, step 116 extracts a scan-line from each black margin removed frame to generate a scan-line image, and then up-samples the scan-line image to generate the destination scan-line image according to the image resolution/frame rate discrepancy between the black margin removed frames and the first video source. In another case where the black margin removal has been performed and the image resolution/frame rate of the first video source is smaller than the image resolution/frame rate of the black margin removed frames of the second video source, step 116 down-samples the black margin removed frames according to the image resolution/frame rate discrepancy between the black margin removed frames and the first video source, and then extracts a scan-line from each down-sampled black margin removed frame to obtain the destination scan-line image. In another case where the black margin removal has been performed and the image resolution/frame rate of the first video source is smaller than the image resolution/frame rate of the second video source, step 116 extracts a scan-line from each black margin removed frame to generate a scan-line image, and then down-samples the scan-line image to generate the destination scan-line image according to the image resolution/frame rate discrepancy between the black margin removed frames and the first video source.

It should be noted that the present invention preferably uses the down-sampling operation to reduce the amount of data to be processed in the following scan-line image matching stage. Additionally, in order to reduce computational complexity, a preferred embodiment of the present invention first enables the down-sampling operation and then extracts scan-lines from the down-sampling result.

After the source scan-line image and the destination scan-line image are both ready, the scan-line image matching operation is started. In the present invention, steps 120-132 are used for obtaining a plurality of candidate matching point pairs. As shown in the flow of FIG. 2, the candidate matching point pair searching is not stopped until N is equal to a preset value K. In other words, the candidate matching point pair searching is repeated, trying to identify at most K candidate matching point pairs according to the present invention. The candidate matching point pair searching is detailed as below.

Figure 7:
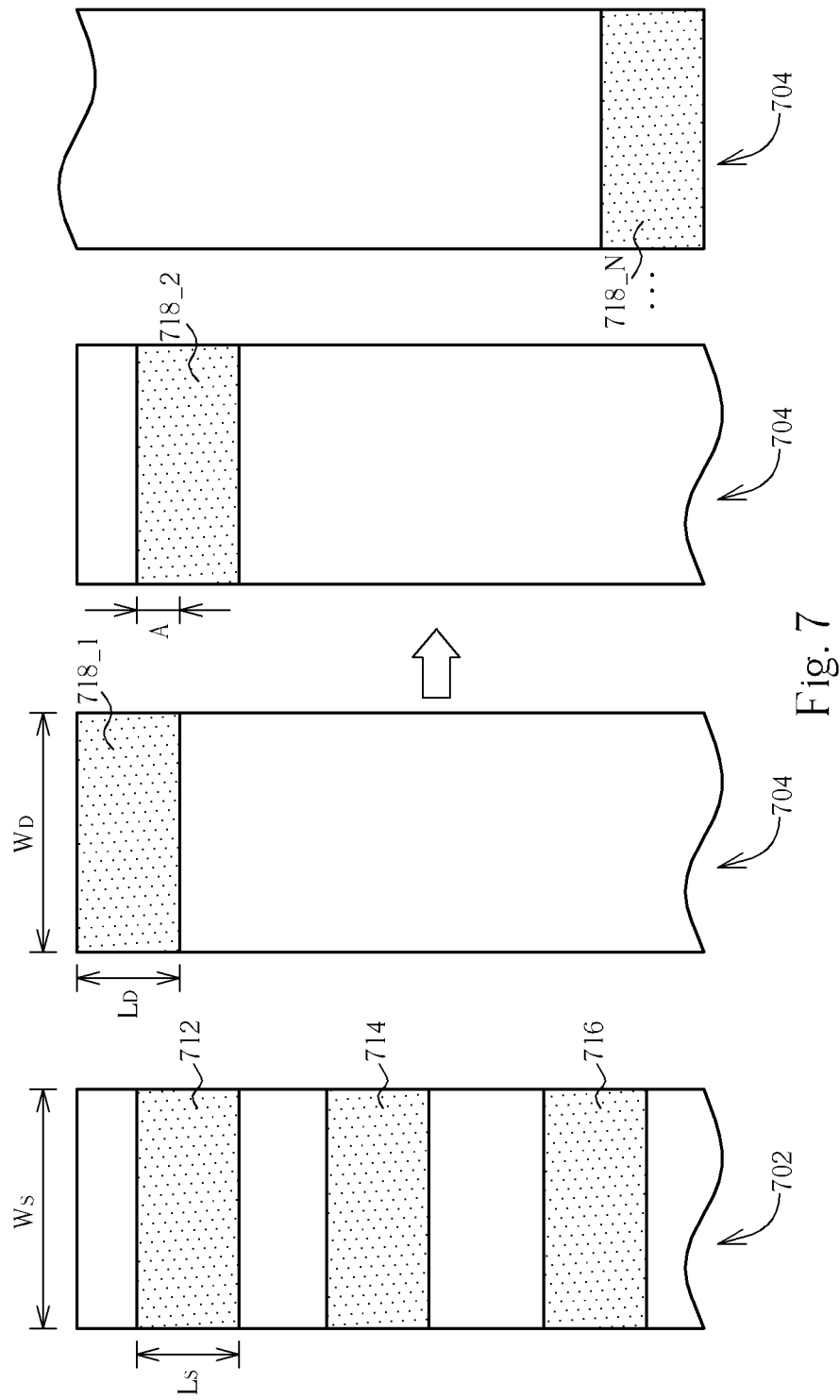
FIG. 7 is a diagram illustrating an exemplary scan-line image matching operation according to the present invention.

In step 122, a comparing frame is randomly selected from the source scan-line image. For example, 400 successive rows (i.e., scan-lines) of the source scan-line image are selected to act as a comparing frame used in the following scan-line image matching operation. Next, the selected comparing frame is compared with the destination scan-line image according to a sliding window having a size equal to that of the comparing frame (step 124). Please refer to FIG. 7, which is a diagram illustrating an exemplary scan-line image matching operation according to the present invention. As shown in FIG. 7, length of the comparing frames 712, 714, 716 is equal to $L_S$, and width of the comparing frame is equal to $W_S$; additionally, length of the sliding window 718_1, 718_2, ..., 718_N is equal to $L_D$, and width of the sliding window 718_1, 718_2, ..., 718_N is equal to $W_D$. As one can see, the size of each comparing frame 712, 714 or 716 selected from the source scan-line image 702 is equal to that of the sliding window 718_1, 718_2, ..., 718_N of the destination scan-line image 704. In step 122, the comparing frame 712 having a size equal to $L_S*W_S$ is compared with the whole destination scan-line image 704 according to the sliding window 718_1, 718_2, ..., 718_N. In this embodiment, two parameters, an image difference value P1 and an image correlation value P2, are calculated when the selected comparing frame is compared with the current sliding window (step 126). Computations of the image difference value P1 and image correlation value P2 for the current sliding window are represented by the following equations:

$$P1 = \frac{|S-D|}{imgSize} \quad (1)$$

$$P2 = \frac{E(SD) - E(S)E(D)}{\sqrt{E(S^2) - E^2(S)}\sqrt{E(D^2) - E^2(D)}} \quad (2)$$

In above equation (1), S represents the source image of the comparing frame (e.g., the comparing frame 712 shown in FIG. 7); D represents the destination image of the sliding window (e.g., the sliding window 718_1 shown in FIG. 7); and imgSize represents the size of the comparing frame/sliding window. The pixel difference between pixels in the source image and counterpart pixels in the destination image is accumulated according to a pixel-by-pixel fashion, and then an average pixel value difference is obtained to serve as the image difference value P1 corresponding to the current sliding window. Regarding the image correlation value P2, a well-known correlation computation is used to judge the correlation between pixels in the source image and destination image. As the correlation commutation is known to those skilled in this art, further description is omitted here for the sake of brevity.

After the image difference value P1 and image correlation value P2 corresponding to the initial sliding window 718_1 have been obtained, the current sliding window is advanced to a next position. In this embodiment, an overlap A is applied when advancing the sliding window. For example, provided the length $L_D$ of the sliding window is equal to 400, the overlap A is configured to be 100. However, this is for illustrative purposes only, and is not meant to be a limitation of the present invention. Similarly, the image difference value P1 and image correlation value P2 corresponding to the sliding window 718_2 are computed as well (step 126). Briefly summarized, the sliding window is advanced from the beginning of the destination scan-line image 704 to the end of the destination scan-line image 704. After the image difference value P1 and image correlation value P2 corresponding to the last sliding window 718_N are obtained, step 128 decides a candidate matching point pair according to the image correlation values and the image difference values. In this embodiment, if there is a specific destination image, defined by the sliding window of the destination scan-line image, having a minimum image difference value and a maximum image correlation value which confirm the existence of a potential synchronization candidate, a candidate matching point pair is therefore found between the specific destination image (e.g., the destination image corresponding to the sliding window 718_2) and the comparing frame 712; otherwise, no candidate matching point pair can be identified in this round of scan-line image matching operation.

When the number of times of executing the scan-line image matching for different comparing frames selected from the source scan-line image is not equal to a preset value K yet, a next round of scan-line image matching is enabled (steps 130 and 132). A new comparing frame (i.e., the comparing frame 714 shown in FIG. 7) is selected and then compared with the destination scan-line image 704 to find a corresponding candidate matching point pair. As the operation of identifying the candidate matching point pair has been detailed above, further description is omitted here for the sake of brevity.

Figure 8:
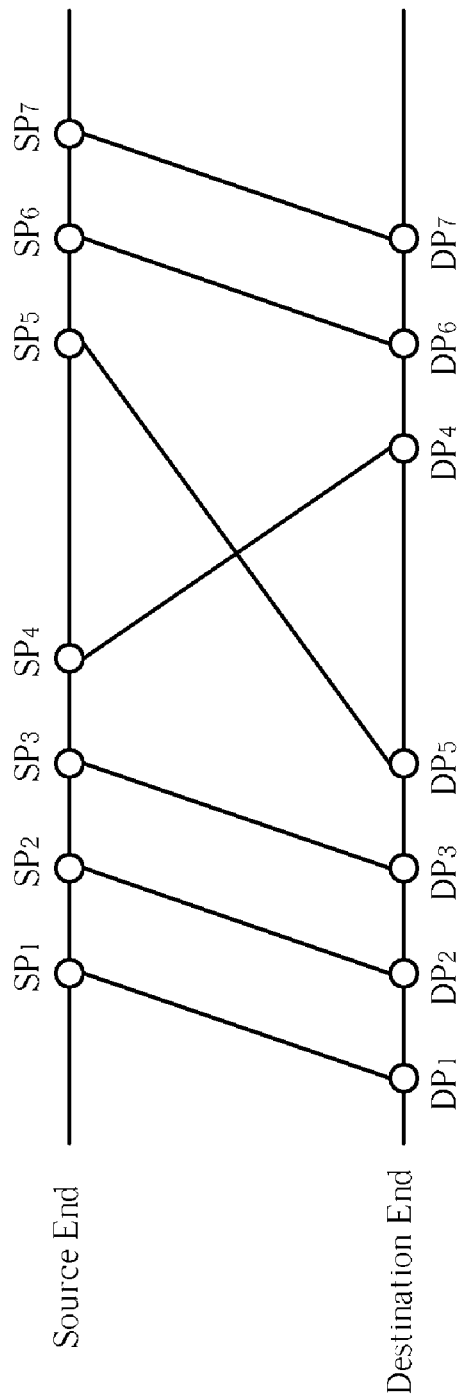
FIG. 8 is a diagram illustrating a plurality of candidate matching point pairs found in several rounds of the scan-line image matching operation.

When the number of times of executing the scan-line image matching for different comparing frames is equal to the preset value K, step 134 is executed to do a majority vote for identifying any invalid candidate matching point pairs. As mentioned above, the commercials inserted to the TV program (e.g., a sports game) broadcasted at the source end that provides the highlight indexing file might be different from that inserted to the TV program received at the source end that receives and uses the highlight indexing file. This might yield erroneous matching point pairs found by steps 120-132. Therefore, it is required to get rid of these outliers before proceeding to following steps for determining the final synchronization point pair. Please refer to FIG. 8. FIG. 8 is a diagram illustrating a plurality of candidate matching point pairs found in several rounds of the scan-line image matching operation. As shown in FIG. 8, seven pairs of candidate matching points, $(SP_1, DP_1)$, $(SP_2, DP_2)$, $(SP_3, DP_3)$, $(SP_4, DP_4)$, $(SP_5, DP_5)$, $(SP_6, DP_6)$, $(SP_7, DP_7)$, are found through preceding steps. In this embodiment, a slope index K for each candidate matching point pair is calculated according to the following equation:

$$K_i = (SP_i - SP_0) - (DP_i - DP_0) \quad (3)$$

In above equation (3), $SP_0$ is representative of a starting time point of the source scan-line image, and $DP_0$ is representative of a starting time point of the destination scan-line image. Referring to above equation (3) and the exemplary diagram shown in FIG. 8, the slope index K is equivalent to an inverse slope for each pair of matching points as the vertical distance between the source end and the destination end is assumed to be a unit distance, i.e., one. By inspecting the slop indexes of the candidate matching point pairs $(SP_1, DP_1)$, $(SP_2, DP_2)$, $(SP_3, DP_3)$, $(SP_4, DP_4)$, $(SP_5, DP_5)$, $(SP_6, DP_6)$, $(SP_7, DP_7)$, it is easy to identify the candidate matching point pair $(SP_4, DP_4)$ as an invalid pair as its slope index is far different from other candidate matching point pairs having similar values. In short, using the above majority vote processing, the invalid matching point pairs can be identified easily and quickly.

Next, a ratio R of valid candidate matching point pairs to invalid candidate matching point pairs is examined to check the similarity between the first video source at the source end and the second video source recorded at the destination end (step 135). If the ratio is greater than a predetermined threshold TH, the similarity between the first video source and the second video source is acceptable. For example, both video sources have the same video contents substantially though the commercials might differ from each other. The flow then proceeds to step 136. However, if the ratio R is not greater than the predetermined threshold TH, the similarity between the first video source and the second video source is poor. As the first video source and the second video are determined to have different video contents, the flow is aborted accordingly.

When the candidate matching point pairs passes the above similarity check, step 136 is executed to select a rough synchronization point pair out of valid candidate matching point pairs. Please note that any of the candidate matching point pairs can be picked to serve as the desired rough synchronization point pair. For example, the candidate matching point pair $(SP_2, DP_2)$ is selected as the rough synchronization point pair, where the matching point at the source end $SP_2$ serves as a rough source synchronization point corresponding to the source image of the comparing frame 714 in FIG. 7, and the matching point at the destination end $DP_2$ serves as a rough destination synchronization point corresponding to the destination image of the sliding window 718_2. After obtaining the rough synchronization point pair, a fine-tuning process is enabled to get a more accurate synchronization point pair.

Figure 9:
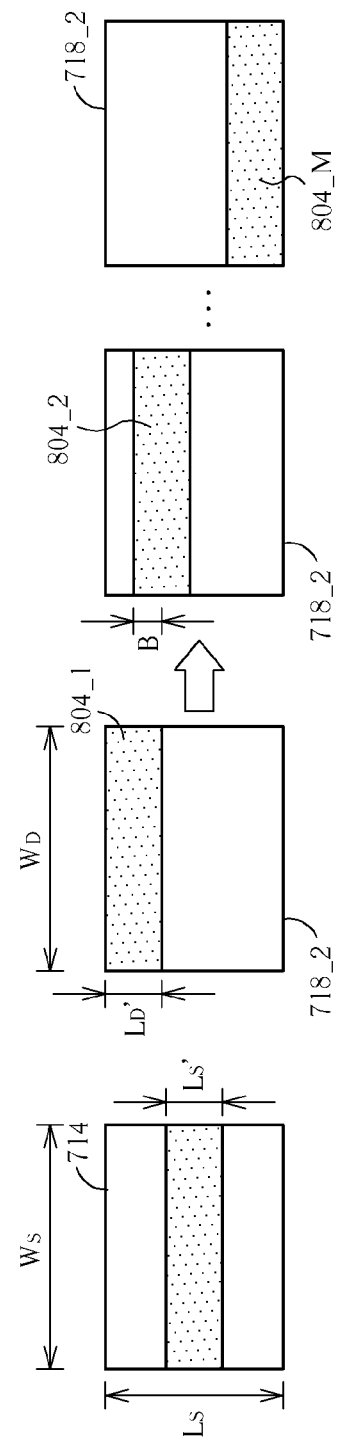
FIG. 9 is a diagram illustrating a fine-tuning process for identifying the target synchronization point pair according to the rough synchronization point pair.

Please refer to FIG. 9. FIG. 9 is a diagram illustrating a fine-tuning process for identifying the target synchronization point pair according to the rough synchronization point pair. In step 136, a comparing portion 802 is selected out of the comparing frame 714 corresponding to the rough source synchronization point $SP_2$. Preferably, a middle portion of the comparing frame 714 is chosen as the comparing portion 802 due to time shift. For example, if the length of the comparing frame 714 is equal to 400, the length of the comparing portion 802 is equal to 50. That is, 50 scan-lines disposed in the middle of the comparing frame 714 are selected. Next, the comparing portion 802 is compared with the source image defined in the sliding window 718_2 according to the smaller sliding window 804_1, 804_2, ..., 804_M having a size equal to that of the comparing portion 802 (step 138). As shown in FIG. 9, length of the comparing portion 802 is equal to $L_S'$, and width of the comparing portion is equal to $W_S$; and length of the sliding window 804_1, 804_2, ..., 804_M is equal to $L_D'$, and width of the sliding window 804_1, 804_2, ..., 804_M is equal to $W_D$. As one can see, the size of the comparing portion 802 selected from the comparing frame 714 is equal to that of the sliding window 804_1, 804_2, ..., 804_M. Additionally, in this embodiment, an overlap B is applied when advancing the sliding window. For example, provided the length $L_D'$ of the sliding window is equal to 50, the overlap B is configured to be 30. However, this is for illustrative purposes only, and is not meant to be a limitation of the present invention.

When the comparing portion 802 with a size equal to $L_S' * W_S$ is compared with the whole destination image of the sliding window 718_2 according to each sliding windows 804_1, 804_2, ..., 804_M, two parameters, an image difference value and an image correlation value, are calculated according to aforementioned equations (1) and (2). After obtaining a plurality of image correlation values and a plurality of image difference values in step 140, the target synchronization point pair is determined according to a specific destination image defined by the sliding window (e.g., the sliding window 804_2) that has a maximum image correlation value and a minimum image difference value.

Figure 10:
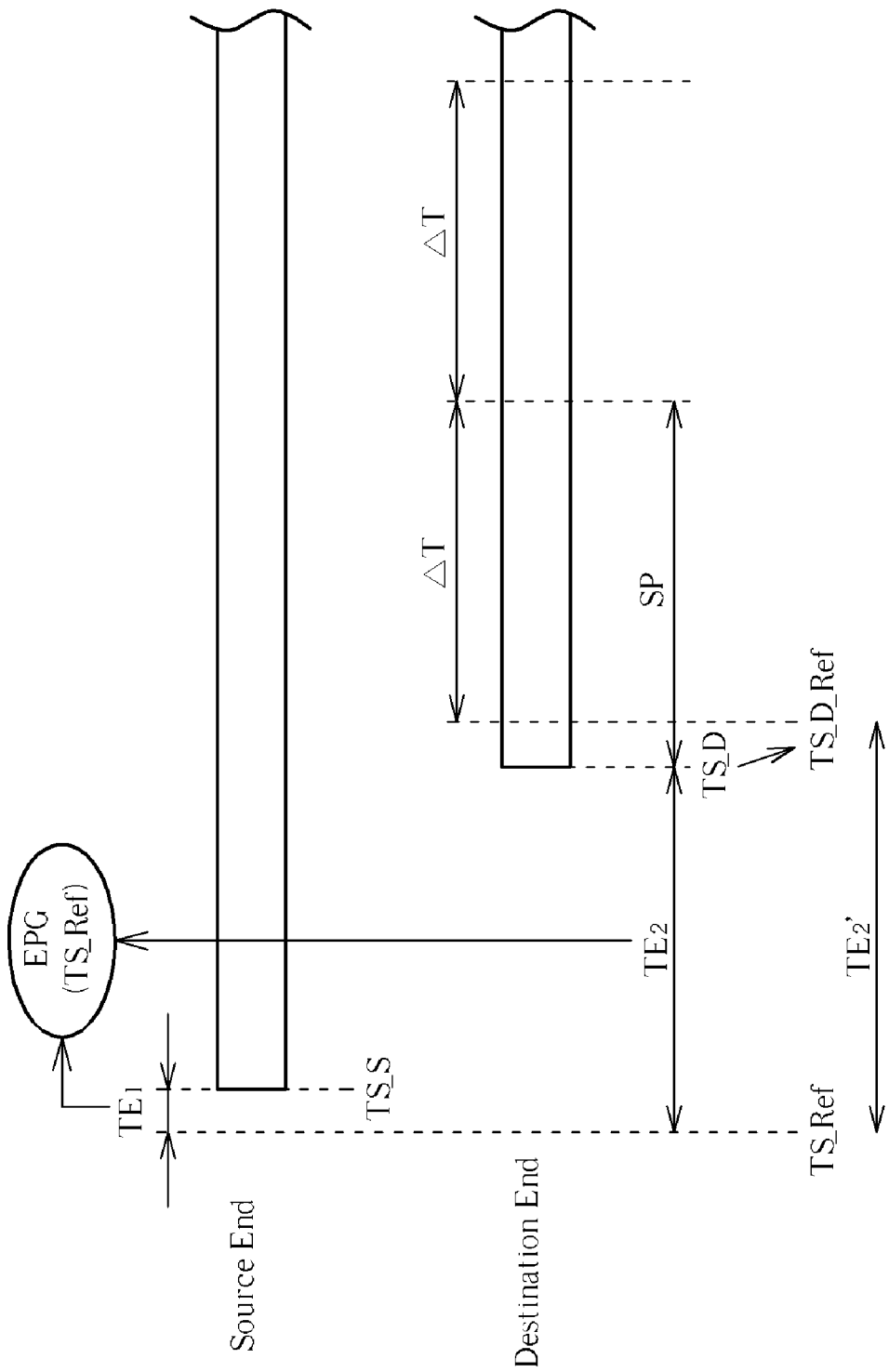
FIG. 10 is a diagram illustrating an exemplary data transmission scheme of the source scan-line image requested by the destination end according to the EPG information.

The above disclosure discloses one embodiment of the present invention. However, alternative designs not departing from the spirit of the present invention are possible. For example, in another embodiment of the present invention using the electronic program guide (EPG) information as a universal time reference, the source scan-line image provided by the source end is not required to include scan-lines extracted from the whole video source at the source end. Please refer to FIG. 10. FIG. 10 is a diagram illustrating an exemplary data transmission scheme of the source scan-line image requested by the destination end according to the EPG information. In general, the EPG includes information of scheduled TV programs, allowing a viewer to navigate, select, and discover contents by time, title, channel number, genre, etc. The time information provided by the EPG can act as a reference time for both the source end which offers the highlight indexing file and the destination end which receives and uses the highlight indexing file.

Suppose the EPG records a reference starting time point of a scheduled TV program to be TS_Ref. When the source end starts broadcasting the scheduled TV program if a local clock of the source end reaches the reference starting time point TS_Ref, it is possible that there is a time error $TE_1$ between the reference starting time point TS_Ref and the local starting time point TS_S as the local clock is not accurately synchronized to a universal clock referenced by the EPG. However, the time error $TE_1$ is generally small, and can be neglected in most cases. Regarding the destination end, it starts recording the scheduled TV program broadcasted by the source end at a local starting time point TS_D according to a its local clock. After referring to the reference starting time point TS_Ref provided by the EPG, the destination end knows that there is a time error $TE_2$ between the reference starting time point TS_Ref and the local starting time point TS_D. It should be noted that the time error $TE_2$ cannot be directly used to determine a time shift between the source end and the destination end as the local clock might not be accurately synchronized to the universal clock referenced by the EPG. In other words, the local starting point TS_D determined according to the local clock of the destination end is actually a reference starting point TS_D_Ref determined according to the universal clock. Provided the time error TE1 is negligible, the real time shift between the source end and the destination end is $TE_2$' instead of $TE_2$. Therefore, the above-mentioned steps shown in FIG. 1 and FIG. 2 are used to find the target synchronization point pair for estimating the actual time shift between the source end and the destination end. After the actual time shift is estimated using the disclosed scan-line image matching scheme, the destination end is able to utilize the highlight indexing file properly.

However, with the help of the EPG information, the data size of source scan-line image transmission can be reduced, and a local synchronization can be achieved. As mentioned above, the destination end starts recording the TV program at the local starting time point TS_D. In one embodiment of the present invention, the destination end will request the source end for a scan-line image segment corresponding to a duration starting from $SP+(TE_2-TE_1)-\Delta T$ through $SP+(TE_2-TE_1)+\Delta T$. It should be noted that $TE_1$ is negligible, and the $\Delta T$ is adjustable according to design requirements. Additionally, as the source end merely provides a source scan-line image segment in response to the request from the destination end, there is no need for the destination end to compare the comparing frames selected from the source scan-line image segment with the scan-line image of the whole video source recorded at the destination end. In other words, the destination end is allowed to compare the comparing frames selected from the source scan-line image segment with a portion of the scan-line image of the whole video source recorded at the destination end.

Furthermore, the scan-line image information (i.e., the complete source scan-line image or the source scan-line image segment) transmitted from the source end to the destination end can be compressed to reduce the data size of transmission. For example, the source-end compresses the source scan-line image into a JPEG file, and the destination end recovers the source scan-line image by decompressing the received JPEG file.

In addition, in above exemplary embodiments, two parameters, an image difference value and an image correlation value, are both required for identifying the aforementioned candidate matching point pairs and the target synchronization point pair. However, in other embodiments of the present invention, the same objective of identifying the candidate matching point pair and the target synchronization point pair can be achieved by using one of the image difference value and the image correlation value. For example, in a first case where only the image difference values are computed, the candidate matching point pairs and the target synchronization point pair are identified according to a minimum of the image difference values; in a second case where only the image correlation values are computed, the candidate matching point pairs and the target synchronization point pair are identified according to a maximum of the image correlation values. These alternative designs still obey the spirit of the present invention, and fall in the scope of the present invention.

Those skilled in the art will readily observe that numerous modifications and alterations of the device and method may be made while retaining the teachings of the invention.

What is claimed is:

1. A method of identifying a target synchronization point pair including a source synchronization point corresponding to a source end and a destination synchronization point corresponding to a destination end, the method comprising:

utilizing the destination end for receiving a source scan-line image corresponding to a first video source from the source end, wherein the source scan-line image is created by extracting one scan-line from each frame of the first video source, the first video source having a plurality of frames and the created source scan-line image comprising a plurality of scan-lines;

utilizing the destination end for selecting at least a comparing frame out of the source scan-line image;

utilizing the destination end for providing a destination scan-line image corresponding to a second video source at the destination end, wherein the destination scan-line image is created by extracting one scan-line from each frame of the second video source, the second video source having a plurality of frames and the created destination scan-line image comprising a plurality of scan-lines; and utilizing the destination end for determining the target synchronization point pair by comparing the comparing frame and the destination scan-line image and finding matching image correlation values.

2. The method of claim 1, wherein the step of receiving the source scan-line image comprises:
- receiving a compressed scan-line image from the source end; and
- decompressing the compressed scan-line image to get the source scan-line image at the destination end.

3. The method of claim 1, wherein the step of receiving the source scan-line image comprises:
- requesting the source end for at least a scan-line image segment according to information of an electronic program guide (EPG); and
- receiving the scan-line image segment as the source scan-line image from the source end.

4. The method of claim 3, wherein the step of requesting the source end for at least the scan-line image segment according to information of the EPG comprises:
- determining a time error between a starting time point of the second video source and a reference starting time point provided by the EPG;
- referring to the time error to determine a time duration after the starting time point of the second video source; and
- requesting the source end for the scan-line image segment corresponding to the time duration.

5. The method of claim 1, wherein the step of providing the destination scan-line image comprises:
- applying a black margin detection to the second video source to identify a black margin inserted to each frame of the second video source;
- obtaining black margin removed frames according to results of the black margin detection; and
- generating the destination scan-line image according to the black margin removed frames.

6. The method of claim 5, wherein the step of applying the black margin detection to the second video source comprises:
- generating a black image having an image size equal to a frame size corresponding to the second video source;
- performing an XOR operation to combine the black image and a frame in the second video source to generate a binary image;
- performing a NOT operation upon the binary image to generate an updated binary image;
- for each row of the updated binary image, performing an AND operation upon pixels located at the same row; and
- identifying the black margin according to results of the AND operation applied to pixels at rows of the updated binary image.

7. The method of claim 6, wherein the step of applying the black margin detection to the second video source further comprises:
- before executing the XOR operation, pre-processing the frame by making each pixel having an original pixel value equal to or smaller than a predetermined value to have an updated pixel value equal to zero.

8. The method of claim 5, wherein the step of generating the destination scan-line image according to the black margin removed frames comprises:
- adjusting the black margin removed frames to generate adjusted black margin removed frames according to an image resolution discrepancy or a frame rate discrepancy between the black margin removed frames and the first video source; and
- generating the destination scan-line image according to the adjusted black margin removed frames.

9. The method of claim 5, wherein the step of generating the destination scan-line image according to the black margin removed frames comprises:
- generating a scan-line image according to the black margin removed frames;
- adjusting the scan-line image to generate the destination scan-line image according to an image resolution discrepancy or a frame rate discrepancy between the black margin removed frames and the first video source.

10. The method of claim 5, wherein the step of receiving the source scan-line image further comprises:
- adjusting the source scan-line image according to an image resolution discrepancy or a frame rate discrepancy between the black margin removed frames and the first video source.

11. The method of claim 5, wherein the step of providing the destination scan-line image comprises:
- generating a scan-line image according to frames of the second video source;
- adjusting the scan-line image to generate the destination scan-line image according to an image resolution discrepancy or a frame rate discrepancy between the second video source and the first video source.

12. The method of claim 1, wherein the step of providing the destination scan-line image comprises:
- adjusting frames of the second video source to generate adjusted frames according to an image resolution discrepancy or a frame rate discrepancy between the second video source and the first video source; and
- generating the destination scan-line image according to the adjusted frames.

13. The method of claim 1, wherein the step of receiving the source scan-line image further adjusts the source scan-line image according to an image resolution discrepancy or a frame rate discrepancy between the second video source and the first video source.

14. The method of claim 1, wherein the step of selecting at least the comparing frame from the source scan-line image comprises selecting a plurality of comparing frames from the source scan-line image; and the step of determining the target synchronization point pair comprises:
- respectively comparing the comparing frames and the destination scan-line image for identifying a plurality of candidate matching point pairs;
- checking the candidate matching point pairs to select a rough synchronization point pair out of the candidate matching point pairs, wherein the rough synchronization point pair includes a rough source synchronization point and a rough destination synchronization point;
- selecting a comparing portion out of a specific comparing frame corresponding to the rough source synchronization point; and
- comparing the comparing portion with a portion of the destination scan-line image that corresponds to the rough destination synchronization point to determine the target synchronization point pair.

15. The method of claim 14, wherein the comparing portion is a middle portion of the specific comparing frame corresponding to the rough source synchronization point.

16. The method of claim 14, wherein the step of checking the candidate matching point pairs comprises:
- calculating a slope index for each candidate matching point pair according to the corresponding candidate matching point pair, a starting time point of the second video source, and a starting time point of the first video source;
- checking the slope index to determine if the corresponding candidate matching point pair is a valid matching point pair or an invalid matching point pair; and
- selecting one of valid matching point pairs as the rough synchronization point pair.

17. The method of claim 16, further comprising:
checking a ratio of valid matching point pairs to invalid matching point pairs for determining similarity between the first video source and the second video source.

18. The method of claim 14, wherein the step of comparing the comparing portion with the portion of the destination scan-line image comprises:
providing a sliding window for the destination scan-line image, wherein a size of the sliding window is equal to a size of the comparing portion;
calculating a plurality of image difference values according to the comparing portion and the sliding window; and
determining the target synchronization point pair according to a destination image defined by the sliding window and having a minimum value of the image difference values.

19. The method of claim 14, wherein the step of comparing the comparing portion with the portion of the destination scan-line image comprises:
providing a sliding window for the destination scan-line image, wherein a size of the sliding window is equal to a size of the comparing portion;
calculating a plurality of image correlation values according to the comparing portion and the sliding window; and
determining the target synchronization point pair according to a destination image defined by the sliding window and having a maximum value of the image correlation values.

20. The method of claim 14, wherein the step of comparing the comparing portion with the portion of the destination scan-line image comprises:
providing a sliding window for the destination scan-line image, wherein a size of the sliding window is equal to a size of the comparing portion;
calculating a plurality of image difference values according to the comparing portion and the sliding window;
calculating a plurality of image correlation values according to the comparing portion and the sliding window; and
determining the target synchronization point pair according to a destination image defined by the sliding window and having a minimum value of the image difference values and a maximum value of the image correlation values.

21. The method of claim 14, wherein the step of respectively comparing the comparing frames and the destination scan-line image for identifying the candidate matching point pairs comprises:
for each of the comparing frames:
providing a sliding window for the destination scan-line image, wherein a size of the sliding window is equal to a size of the comparing frame;
calculating a plurality of image difference values according to the comparing frame and the sliding window; and
determining a candidate matching point pair according to a destination image defined by the sliding window and having a minimum value of the image difference values.

22. The method of claim 14, wherein the step of respectively comparing the comparing frames and the destination scan-line image for identifying the candidate matching point pairs comprises:
for each of the comparing frames:
providing a sliding window for the destination scan-line image, wherein a size of the sliding window is equal to a size of the comparing frame;
calculating a plurality of image correlation values according to the comparing frame and the sliding window; and
determining a candidate matching point pair according to a destination image defined by the sliding window and having a maximum value of the image correlation values.

23. The method of claim 14, wherein the step of respectively comparing the comparing frames and the destination scan-line image for identifying the candidate matching point pairs comprises:
for each of the comparing frames:
providing a sliding window for the destination scan-line image, wherein a size of the sliding window is equal to a size of the comparing portion;
calculating a plurality of image difference values according to the comparing frame and the sliding window;
calculating a plurality of image correlation values according to the comparing frame and the sliding window; and
determining a candidate matching point pair according to a destination image defined by the sliding window and having a minimum value of the image difference values and a maximum value of the image correlation values.

24. The method of claim 1, further comprising:
estimating a time shift between the source end and the destination end according to the target synchronization point pair.

25. A method of identifying a target synchronization point pair including a source synchronization point corresponding to a source end and a destination synchronization point corresponding to a destination end, the method comprising:
utilizing the destination end for receiving a source scan-line image corresponding to a first video source from the source end;
utilizing the destination end for selecting at least a comparing frame out of the source scan-line image;
utilizing the destination end for providing a destination scan-line image corresponding to a second video source at the destination end, comprising:
applying a black margin detection to the second video source to identify a black margin inserted to each frame of the second video source, comprising:
generating a black image having an image size equal to a frame size corresponding to the second video source;
performing an XOR operation to combine the black image and a frame in the second video source to generate a binary image;
performing a NOT operation upon the binary image to generate an updated binary image;
for each row of the updated binary image, performing an AND operation upon pixels located at the same row; and
identifying the black margin according to results of the AND operation applied to pixels at rows of the updated binary image;
obtaining black margin removed frames according to results of the black margin detection; and
generating the destination scan-line image according to the black margin removed frames; and
utilizing the destination end for determining the target synchronization point pair by comparing the comparing frame and the destination scan-line image.

* * * * *